United States Patent Office
3,428,209
Patented Feb. 18, 1969

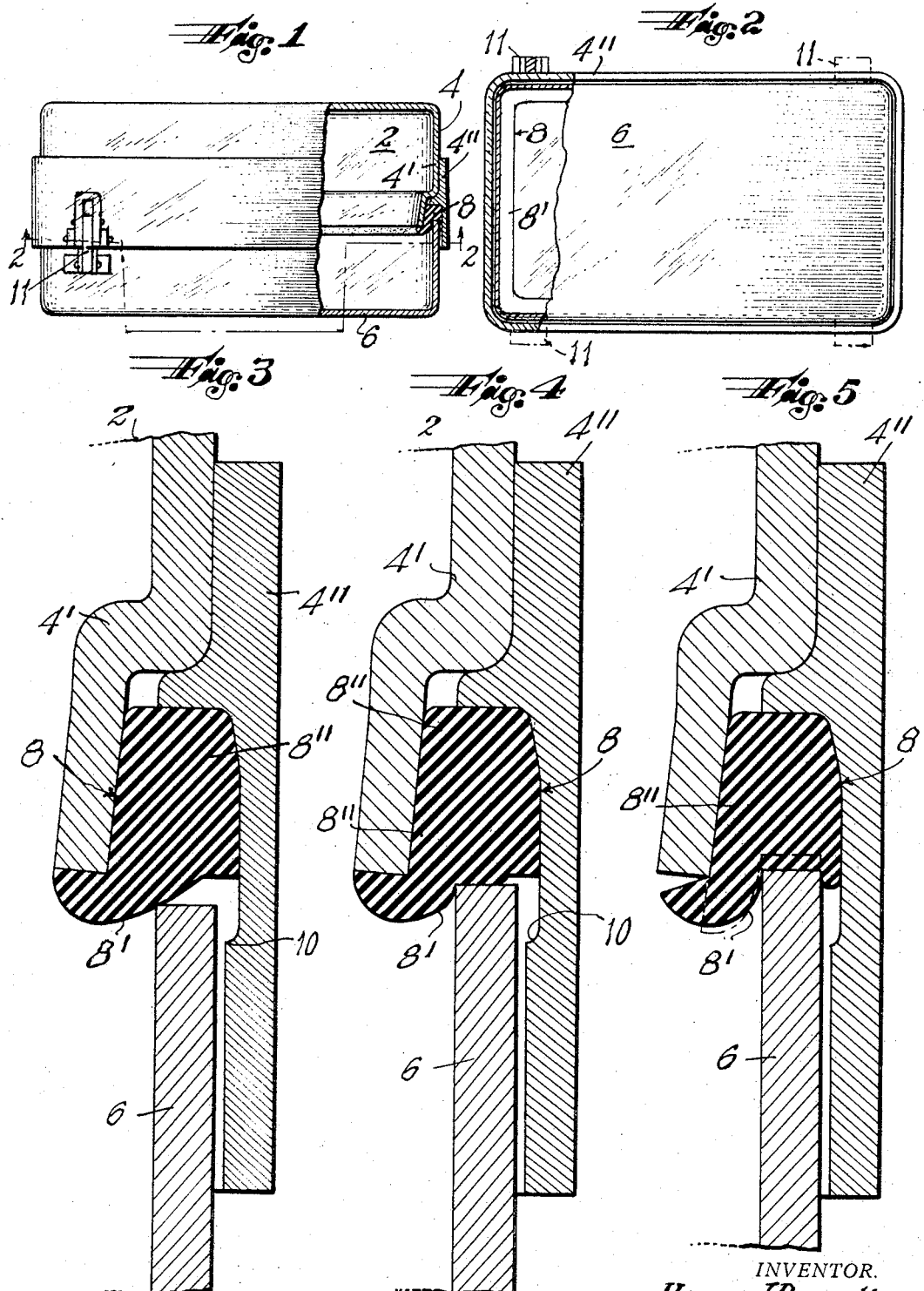

3,428,209
GASKETED CLOSURE
Henry J. Brucker, Summit, and Bernard M. Jenkins, Chatham, N.J., assignors to American Aluminum Company, Mountainside, N.J., a corporation of New Jersey
Filed Mar. 21, 1968, Ser. No. 714,872
U.S. Cl. 220—46    6 Claims
Int. Cl. B65d 45/20, 53/02; F16j 15/48

ABSTRACT OF THE DISCLOSURE

A closure apparatus utilizes a gasket retained in a U-shaped member wherein an arcuate portion of the gasket provides an immediate seal with a second member when the members are moved toward each other. Further movement of the members causes the gasket material to roll in against the side of the second member to provide a secure seal.

Background of the invention

This invention pertains to the field of closure apparatus including gasket and other arrangements whereby two members are temporarily sealed.

The prior art includes many gasket and sealing arrangements such as the well known gaskets used on oil pans in the automotive field.

The typical arrangement is of the nature wherein the gasket is glued to one member and the other member abuts the gasket and high pressure is applied to maintain the seal. Two disadvantages of such an arrangement are that the gasket must be glued to one of the two members and a great deal of pressure is required to insure a continuous seal due to the fact that the members directly abut the gasket material.

Summary of the invention

This invention provides closure apparatus whereby two members, such as the top and bottom of a box, may be sealed with relatively little pressure by the use of a gasket which need not be glued to either member. This is accomplished by forcibly placing the gasket into a U-shaped portion of one member while an arcuate portion of the gasket is exposed for contact with the second member. When the second member meets the arcuate portion of the gasket an immediate seal is effected. Upon further movement of the second member toward the first member, the gasket material at the most extended portion of the arc rolls in toward the side of the second member to form a tight seal without compressing the gasket material.

In this manner an efficient seal is provided without the need of adhesive material, the retained gasket being forcibly retained by its tapered configuration and further prevented from inadvertent misplacement due to a retaining lip or ledge.

A brief description of the drawings

FIG. 1 is a partial cross section of a two piece container utilizing the closure apparatus of the invention.

FIG. 2 is a composite bottom plan and cross sectional view on the plane of the line 2—2 of FIG. 1.

FIGS. 3, 4 and 5 are cross sectional views of the preferred embodiment of the invention showing three steps in distorting the gasket material between the two members to be temporarily sealed.

Description of the preferred embodiment

Referring to the figures, a container 2 has a first member or top portion 4 and a second member or bottom portion 6 which are temporarily sealed with the aid of the gasket 8 which is of a shape to join the annular edge portions of members.

In the preferred embodiment the gasket 8 is rubber although other materials would be suitable.

As may be seen from FIGS. 3, 4 and 5 the top member 4 has an inverted U-shaped portion formed by the two cross sectional pieces 4' and 4". These two pieces of course could be formed as one piece.

The protruding portion 10 formed in the piece 4" acts as a ledge or retainer to prevent the inadvertent misplacement of the gasket 8, which is shown as a ring.

The gasket 8 has an arcuate portion 8' projecting from one end of a body portion 8" which is normally retained in the U-shaped portion of the top 4 by being forcibly inserted therein. The pieces 4' and 4" as well as the gasket 8 are tapered to retain the gasket firmly in the U-shaped portion of the top 4 without the need of adhesive or other retaining assistance.

FIG. 3 shows the bottom 6 at the point of initial contact with the gasket 8.

FIG. 4 illustrates the position after the top 4 and bottom 6 have been moved toward each other. It should be noted that the arcuate or bottom tapered portion of the gasket 8 has begun to distort so that even though the right side of the bottom 6 has not made contact with the gasket, the left side has caused the gasket material to roll in along the left side. By this initial movement the seal has begun to be made even though only a slight force has been applied.

Referring now to FIG. 5 it may be seen that further movement of the bottom 6 has caused the gasket material to roll in further and to be distorted between the portions 6 and 4" to provide a secure seal. The sideways pressure of piece 4" acts to further provide a secure seal.

Auxiliary securing means 11 such as a clasp or other means may be provided to retain the top and bottom portions in their sealed relationship.

The bottom configuration of the gasket 8 may be tapered linearly or tapered arcuately as shown in FIG. 3.

It is thus seen that, in the preferred embodiment, the use of the forcibly retained rubber gasket in the U-shaped top member is acted upon by the lower member so that upon closure the lower member engages the arcuately tapered lower portion of the gasket to cause the gasket material to roll in against the lower member to provide a seal which is aided by the side pressure from the piece 4". The ledge 10 prevents inadvertent loss of the gasket from the top member.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. Closure apparatus comprising first and second members to be temporarily sealed, and deformable gasket means, the first member having a substantially U-shaped portion formed therein for receiving the said gasket means, the gasket means including a tapered cross section portion so that relative movement of the first and second members toward each other causes the gasket means to distort to form an immediate seal and further movement of the members further distorts the gasket means to roll so as to surround a portion of the second member to provide an even more secure seal.

2. Apparatus according to claim 1 wherein the first member and gasket means are tapered so that the gasket will be forcibly retained by the U-shaped portion of the first member.

3. Apparatus according to claim 1 wherein the said first member includes a protruding portion to prevent the inadvertent separation of the gasket means from the U-shaped portion of the first member.

4. Apparatus according to claim 1 wherein the tapered portion of the gasket means is arcuate in cross section.

5. Gasket means having one side tapered toward its top which has a lesser dimension, the bottom portion including an arcaute portion between the tapered side and the longer other side.

6. Closure apparatus comprising first and second members having annular portions to be sealed, said annular portion of the first member having an outwardly facing U-shaped groove, a resiliently deformable gasket ring seated in said U-shaped groove and having an outwardly facing arcuate surface engageable by the annular portion of the second member to form first an immediate seal between said annular portions during the first part of the movement of the members toward each other, said arcuate portion extending inwardly of said members from said annular portion of the second member, and said arcuate portion upon continuation of movement of said members toward each other being further deformed and rolled around the inner edge of said annular portion of the second member to provide an even more secure seal.

References Cited

UNITED STATES PATENTS

| 3,167,208 | 1/1965 | Proctor | 220—46 |
| 3,339,934 | 9/1967 | Gordon | 277—205 XR |

GEORGE T. HALL, *Primary Examiner.*